C. P. BETTENGA.
CISTERN FILTER.
APPLICATION FILED JUNE 16, 1919.

1,321,503.

Patented Nov. 11, 1919.

Inventor,
C. P. Bettenga, by
G. C. Kennedy,
Attorney.

UNITED STATES PATENT OFFICE.

CRENO P. BETTENGA, OF PARKERSBURG, IOWA, ASSIGNOR OF ONE-HALF TO CLYDE F. PARKER, OF WATERLOO, IOWA.

CISTERN-FILTER.

1,321,503.  Specification of Letters Patent.  Patented Nov. 11, 1919.

Application filed June 16, 1919. Serial No. 304,543.

*To all whom it may concern:*

Be it known that I, CRENO P. BETTENGA, a citizen of the United States of America, a resident of Parkersburg, Butler county, Iowa, have invented certain new and useful Improvements in Cistern-Filters, of which the following is a specification.

My invention relates to improvements in cistern filters, and the object of my invention is to provide such a filter with a combination device adapted to both filter water passed through it and separately catch and independently discharge light sedimentary matter, preventing the latter from being carried by the rush of water into the cistern.

Figure 1:
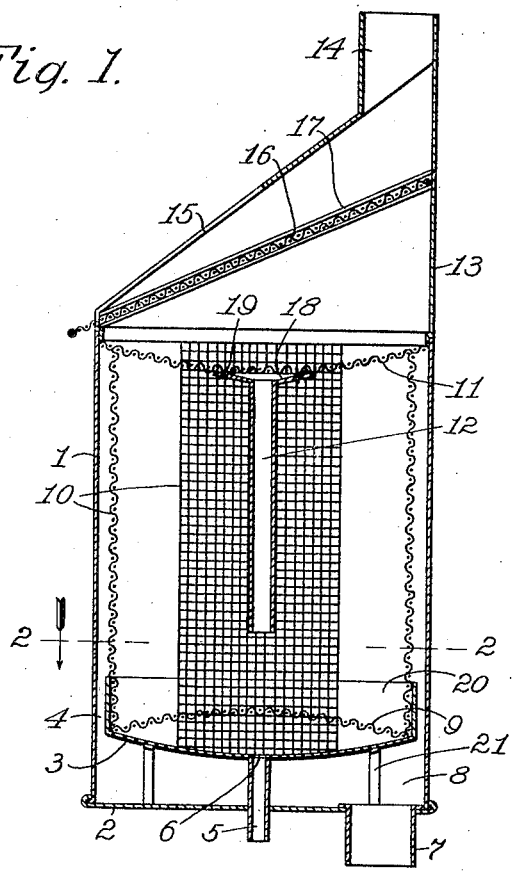
Figure 2:
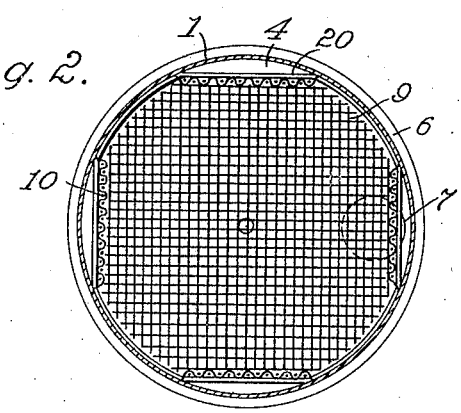

This object I have accomplished by the means which are hereinafter described and claimed, and which are illustrated in the accompanying drawings, in which Figure 1 is a central vertical section of my improved device, and Fig. 2 is a horizontal section thereof, taken on the broken line 2—2 of said Fig. 1, looking in the direction indicated by the arrow.

Similar numerals of reference denote corresponding parts throughout the several views.

The numeral 1 denotes a cylindrical casing having a removable top closure 13 which has its top sloped forwardly, provided with a relatively large opening 15 and at its vertex with an inlet-tube 14. On opposite sides of the inner wall of the closure 13 are downwardly and forwardly inclined longitudinally channeled slideways 16 within which are seated the side edges of a reticulated inclined strainer 17, preferably made of woven wire netting, and adapted to receive upon its upper surface relatively bulky matters, such as leaves, to divert them outwardly from the device through said opening 15. The reticulated slide 17 may be removed for cleaning, repairs or substitution. In the bottom 2 of said casing is an eccentrically-located outlet-tube 7, adapted to discharge filtered water into a pipe leading to a cistern. A short open-ended vertical tube 5 traverses the center of the bottom 2, for a purpose to be described.

Within the lower part of said casing is positioned a shallow open top vessel 3, with concave or dished bottom having a raised rim 20, the latter having portions closely fitting the inner wall of the casing, and alternated portions spaced from said inner wall to provide segmental passages 4 between said rim and wall to effect communications between the interior of the casing above said vessel and the chambered space 8 below it. This vessel 3, or catch-basin, may, for the purpose of brevity, be termed the bowl 3, and may be either fixedly or removably mounted in said casing. When removably mounted, it may be supported on a plurality of legs 21 to keep it level. The downwardly dished bottom of the bowl 3 has a central orifice 6 which delivers directly into the open upper end of said tube 5.

Upon and covering the concave bottom of said bowl is placed a reticulated body 9, removably. The numeral 10 denotes vertically-disposed reticulated screens or partitions whose lower ends rest upon the bottom of the bowl 3 against the straight parts of the rim 20, with their longitudinal edges directed upwardly along and in contact with the inner wall of the casing. These reticulated partitions 10 thus are interposed between the interior space of the casing above the convex body 9 and the passages 4. The numeral 11 denotes a downwardly dished reticulated body supported upon the upper edges of the partitions 10, removably.
The numeral 12 denotes an open tube extended downwardly centrally through the interior space of the casing from the center of the dished reticulated body 11, and may be secured to the latter or not, as desired, but as shown, said tube has an expanded upper end 18 which is secured to the reticulated body 11 by small rings 19. This tube 12 depends to within a short distance above the center of the lower reticulated body 9.

In practice, after the removal of the closure 13 and the upper reticulated body 11, the interior space of the casing above the lower reticulated body 9 may be filled with a suitable filtering material, such as fragments of charcoal. In replacing the reticulated body 11, the tube 12 is thrust downwardly centrally through the charcoal. The tube 12 permits water to be delivered centrally into the mass of charcoal at so short a distance above the reticulated body 9 that the straining action of the charcoal becomes incipient at a place where the momentum of the descending water is checked by the bowl 3 and the water forced to ascend and accumulate within the casing, as the areas of the passages 4 barely permit complete delivery or nearly complete delivery of the water delivered to them. It will be seen that this diversion prevents such overwhelming eddy-currents as might carry into the cistern the finer sedimentary particles which have traversed the filtering substance.

These fine particles, such as those of soot, to which the charcoal is pervious, are caught by the bowl or catch-basin 3 during the momentary checking and reversal of the movement of the water, and are prevented from issuing thence into the passages 4 by the relatively high rim 20 of said bowl. These particles move down the concave bottom of the bowl and are discharged thence by way of the tube 5 without the casing, by pressure of the superincumbent water, and without depreciable loss of water from the casing.

The water discharged into the cistern is thereby freed from all soot, and the device is automatically self-cleansing at all times, therefore requires but infrequent attention, disassembling or cleaning out.

Having described my invention, what I claim as new, and desire to secure by Letters Patent, is:

1. A filter, comprising a casing having an outlet in its bottom, a bowl positioned within the casing, spaced from its bottom and inner wall, and a conduit-pipe below and communicating with the bowl, traversing the bottom of the casing and sealed therein to discharge outwardly thereof.

2. A filter, comprising a casing having an outlet in its bottom, a bowl mounted upon and spaced from said bottom with a passage between the bowl and the inner wall of the casing, said bowl having a central outlet-opening, a discharge-tube mounted tightly in said casing-bottom and communicating with said opening in the bowl, and a reticulated partition in the casing and hooding said passage between the casing and bowl.

3. A filter, comprising a casing having an outlet in its bottom, a bowl with concave bottom and raised rim mounted in the casing and spaced above its bottom, with a passage between the edge of the bowl and the inner wall of the casing, an upwardly convex reticulated element covering said bowl, and a reticulated element screening said passage from the bowl.

4. A filter, comprising a casing having an outlet in its bottom, a bowl mounted within the casing, a discharge-pipe in the bottom of the casing in communication with the bowl only, a passage being provided between the bowl and the inner wall of the casing communicating below the bowl with said first-mentioned outlet, an upwardly convex reticulated cover removably mounted upon said bowl, an upright reticulated partition separating said passage from the interior of the bowl above said convex cover, and an upwardly convex reticulated horizontal removable partition traversing the interior of the casing above said upright partition.

5. A filter, comprising a casing having an outlet in its bottom, a bowl mounted within the casing spaced from its bottom and closed against its inner wall at intervals to supply passages at intervals between it and the casing, an upwardly convex reticulated cover for said bowl, upright reticulated partitions in the casing screening said passages from the interior of the casing above said bowl, a horizontally-disposed reticulated body closing the top of the casing, and an open-ended tube extending from the said body downwardly into the casing part way to said reticulated cover for the bowl.

6. In a filter, a casing having an outlet, a reticulated device within said casing to contain filtering material, and a catch-basin in said casing below said device, receiving therefrom to overflow into said outlet, said casing having a separate discharge-device traversing it and in communication with said catch-basin to discharge sediment collected in the latter received through said reticulated device.

Signed at Waterloo, Iowa, this 30th day of May, 1919.

CRENO P. BETTENGA.

Copies of this patent may be obtained for five cents each, by addressing the "Commissioner of Patents, Washington, D. C."